(12) United States Patent
Helms

(10) Patent No.: US 11,793,097 B1
(45) Date of Patent: Oct. 24, 2023

(54) FARMING IMPLEMENT QUICK-ATTACHMENT SYSTEM

(71) Applicant: James Wade Helms, Dothan, AL (US)

(72) Inventor: James Wade Helms, Dothan, AL (US)

( * ) Notice: Subject to any disclaimer, the term of this patent is extended or adjusted under 35 U.S.C. 154(b) by 387 days.

(21) Appl. No.: 17/210,481

(22) Filed: Mar. 23, 2021

Related U.S. Application Data

(60) Provisional application No. 62/993,432, filed on Mar. 23, 2020.

(51) Int. Cl.
*A01B 59/043* (2006.01)
*A01B 59/00* (2006.01)

(52) U.S. Cl.
CPC .......... *A01B 59/043* (2013.01); *A01B 59/002* (2013.01)

(58) Field of Classification Search
CPC .............................. A01B 59/043; A01B 59/002
See application file for complete search history.

(56) References Cited

U.S. PATENT DOCUMENTS

| | | | | |
|---|---|---|---|---|
| 2,785,614 A * | 3/1957 | Jensen | ................... | A01B 63/32 172/443 |
| 2,786,589 A * | 3/1957 | Garrett | ................... | A01B 51/04 172/275 |
| 3,428,335 A * | 2/1969 | Clark | ..................... | A01B 49/00 172/443 |
| 3,432,184 A * | 3/1969 | Tweedy | ................ | A01B 63/111 280/481 |
| 3,528,507 A * | 9/1970 | Morkoski | .............. | A01B 19/02 172/414 |
| 3,561,789 A * | 2/1971 | Stikeleather et al. | . | A01B 63/12 172/272 |
| 3,608,645 A * | 9/1971 | Meiners | ............... | A01C 23/023 280/755 |
| 3,850,450 A * | 11/1974 | Hadskey | .............. | A01B 59/004 280/482 |
| 4,015,549 A * | 4/1977 | Brown, Jr. | .......... | A01M 7/0082 111/8 |
| 4,073,346 A * | 2/1978 | Groth et al. | ........... | A01B 49/00 172/451 |
| 4,377,979 A | 3/1983 | Peterson et al. | | |
| 4,433,735 A * | 2/1984 | Clark | ..................... | A01B 51/04 172/248 |
| 4,624,471 A * | 11/1986 | Haines et al. | ......... | A01B 51/04 172/776 |
| 4,677,922 A * | 7/1987 | Shrull et al. | ........... | A01B 49/06 172/451 |
| 5,052,495 A * | 10/1991 | McFarlane et al. | . | A01B 73/044 172/417 |

(Continued)

*Primary Examiner* — Thomas B Will
*Assistant Examiner* — Joel F. Mitchell
(74) *Attorney, Agent, or Firm* — ADAMSIP, LLC; James Adams; Stephen Thompson

(57) ABSTRACT

A quick-attachment system may be used for attaching an agricultural planter to a strip till. A frame is initially installed on a strip till and may remain permanently attached to the strip till so that the strip till may be separately used in normal operation with the frame attached but without a planter attached. For combination tilling and planting operations, a planter may be attached by completing a three-point hitch attachment to the frame so that a tractor may be used to pull the combination of strip till and planter. Hydraulic cylinders connected to the frame and to the planter may be used to lift and lower the planter relative to the strip till.

20 Claims, 11 Drawing Sheets

(56) References Cited

U.S. PATENT DOCUMENTS

| | | | |
|---|---|---|---|
| 5,255,756 A * | 10/1993 | Follmer et al. ........ | B62D 53/02 |
| | | | 280/412 |
| 5,499,683 A | 3/1996 | Bassett | |
| 8,430,179 B2 | 4/2013 | Van Buskirk et al. | |
| 8,534,373 B2 | 9/2013 | Van Buskirk et al. | |
| 8,626,408 B1 | 1/2014 | Satzler et al. | |
| 9,055,712 B2 | 6/2015 | Bassett | |
| 9,226,440 B2 | 1/2016 | Bassett | |
| 9,282,689 B2 | 3/2016 | Van Buskirk et al. | |
| 9,788,472 B2 | 10/2017 | Bassett | |
| 10,368,474 B2 * | 8/2019 | Blunier et al. ......... | A01B 63/32 |
| 2006/0191695 A1 | 8/2006 | Walker et al. | |
| 2014/0190712 A1 | 7/2014 | Bassett | |
| 2016/0309641 A1 | 10/2016 | Taunton et al. | |

\* cited by examiner

FARMING IMPLEMENT QUICK-ATTACHMENT SYSTEM

CROSS REFERENCES

This application claims priority to U.S. Provisional Application No. 62/993,432, filed on Mar. 23, 2020, which application is incorporated herein in its entirety by reference.

FIELD OF THE DISCLOSURE

The subject matter of the present disclosure refers generally to a quick-attachment system for attaching farm implements and a method of using the system to attach farming implements for farming.

BACKGROUND

In order to improve efficiency in farming operations, it has become a common practice for farmers to connect an agricultural planter to a tillage tool and then pull the combination of tiller and planter as a single unit behind a single tractor. The combination of tiller and planter used simultaneously in one operation eliminates the need to plant in a separate pass across a field after a first pass for tilling, which may substantially reduce farming costs and increase efficiency. Although combined tilling and planting is not always feasible based on the time of year and soil conditions, it is generally advantageous to farmers to deploy this type of operation whenever possible.

To utilize a combined tilling and planting operation in a single pass, a tiller is first hitched to a tractor and a planter is then attached to the tiller so that the tractor pulls both the tiller and the planter with the planter trailing behind the tiller. However, there are a variety of problems with currently known systems used to attach a planter to a tillage tool such as a strip till machine. For instance, it generally requires a process taking up to several hours to attach the planter to the strip till. New hydraulic hoses and wiring harnesses have to be installed ad hoc to be compatible with known attachment systems in order to complete the attachment. In addition, once attached, the planter and strip till are generally attached to each other on at least a semi-permanent basis in that the two implements cannot be easily detached from each other, which thereby increases both the time of attaching the planter to the strip till and also the time of detaching the planter from the strip till when use of the strip till separately from the planter is required after the planter has been previously attached. Although an agricultural planter may be detached from a tiller using known systems, doing so is a time-consuming process that reduces efficiency, thereby disincentivizing farmers from fully utilizing such systems in farming operations. Thus, currently known systems generally do not allow the option of detaching a planter quickly and then operating the strip till separately at times when a planter cannot be feasibly used in combination with the strip till. In addition, known systems typically do not allow different types and models of agricultural planters to be attached to a strip till using the same system, which may then substantially increase costs associated with such systems as more than one attachment system must be utilized to accommodate different types of planters.

Accordingly, there is a need in the art for a system for quickly and easily attaching an agricultural planter to a tillage tool, as well as for detaching the planter from the tillage tool in order to effectively give farmers the option of using a tillage tool either separately or in combination with a planter.

SUMMARY

A farming implement quick-attachment system and a method of using the quick-attachment system to attach and detach farming implements are provided. In a preferred embodiment, the present system may be utilized to attach an agricultural planter to a tillage tool, such as a strip till, that is hitched to a tractor. The system comprises a rigid frame having a first end and a second end, a plurality of spaced brackets each pivotally coupled to the first end of the frame and configured to fixedly secure each bracket to a toolbar of a first farming implement, a plurality of spaced attachment elements each attached to the second end of the frame and each configured to rotatably secure each of the attachment elements to a second farming implement, a bracket hydraulic cylinder coupled to each respective bracket at one end of the cylinder and to the frame at an opposing end of the cylinder, and a frame hydraulic cylinder coupled to the frame at one end of the cylinder. The frame hydraulic cylinder is configured to connect to the second farming implement at an opposing end of the cylinder. The bracket hydraulic cylinders are configured to vertically pivot the frame relative to the first farming implement when the brackets are secured to the toolbar of the first farming implement, and the frame hydraulic cylinder is configured to vertically pivot the second farming implement relative to the frame when the frame is secured to the second farming implement. In a preferred embodiment, the first farming implement is a strip till, and the second farming implement is an agricultural planter. Thus, both the frame of the quick-attachment system and the planter may be vertically pivoted relative to the strip till using either or both of the bracket hydraulic cylinders and/or the frame hydraulic cylinder. This allows the planter trailing behind the strip till to be lifted out of the way when necessary, such as when the planter is not being used as the tractor is making a turn to make a second pass or when moving over uneven terrain.

In a preferred embodiment, the system further comprises a plurality of hydraulic hoses. One respective hydraulic hose is operably connected at one end of the hose to the frame hydraulic cylinder and to each bracket hydraulic cylinder. Each hose may be connected at an opposing end to a hydraulic system of the tractor to which the strip till is hitched. Additional hydraulic hoses may be connected to the hydraulic system of the tractor at one end of each hose and to a hydraulic system of the planter at an opposing end of each hose. Thus, the present system may be utilized to connect the hydraulic system of the planter to the hydraulic system of the tractor through the hydraulic hoses of the quick-attachment system so that the hydraulic system of the planter is fully operational through normal controls of the hydraulic system of the tractor. This eliminates the need to install new hydraulic hoses ad hoc to connect the two hydraulic systems for central control through the tractor controls. The present system preferably also includes a pre-installed wiring harness so that lighting on the planter may be controlled through normal lighting controls on the tractor.

To use the quick-attachment system, the frame is preferably initially installed on the strip till on at least a semi-permanent basis such that the frame may remain on the strip till indefinitely and still allow normal use of the strip till with or without a planter attached to the frame, but may also be removed from the strip till as necessary, which is typically infrequently, such as for certain types of maintenance or when selling a strip till and desiring to separately retain the quick-attachment system. During initial installation of the frame on the strip till, the brackets of the frame are fastened to the toolbar of the strip till to fixedly secure each of the brackets of the frame to the strip till. Each of the bracket hydraulic cylinders may then be coupled to one of the brackets and to the frame, and the frame hydraulic cylinder may be coupled to the frame. Next, hydraulic hoses may be operably connected to each of the hydraulic cylinders and to appropriate hydraulic hose couplings on the tractor. Hydraulic hoses for use with the hydraulic system of the planter may also be coupled to hydraulic hose couplings on the tractor. The opposing ends of each of these hoses may preferably be held in place by a small bracket attached to the frame so that these hoses are secured out of the way and are also easily available for connection to existing hydraulic hoses on the planter.

Once the frame is initially installed on the strip till, the planter may then be rotatably secured to the second end of the frame via the attachment elements, which preferably each comprise a hook with an upwardly facing open end and a latch. The attachment points on the planter typically comprise a horizontal bar, which may be set within the hooks on the frame and then secured in place by each of the latches. The attachment points on the planter are free to rotate within each of the hooks when the planter is vertically pivoted to lift or lower the planter as needed during normal operation of the system. The frame hydraulic cylinder may then be connected to the planter to form a center link for controlling the vertical pivoting of the planter. Next, existing hydraulic hoses on the planter may be connected to the hydraulic hoses of the present system to provide control of the planter's hydraulic system through the tractor controls. Finally, the planter wiring for lighting may be connected to the wiring harness of the present system to complete the installation. Because the present quick-attachment system can normally remain attached to the strip till at all times, the system may be utilized to quickly and easily attach a planter to or detach a planter from the strip till while leaving the frame in place and attached to the strip till. Thus, a farmer can quickly and easily switch between using a strip till in combination with a planter or using the strip till separately without the planter, thereby providing flexibility in farming operations and increasing efficiency.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 8:
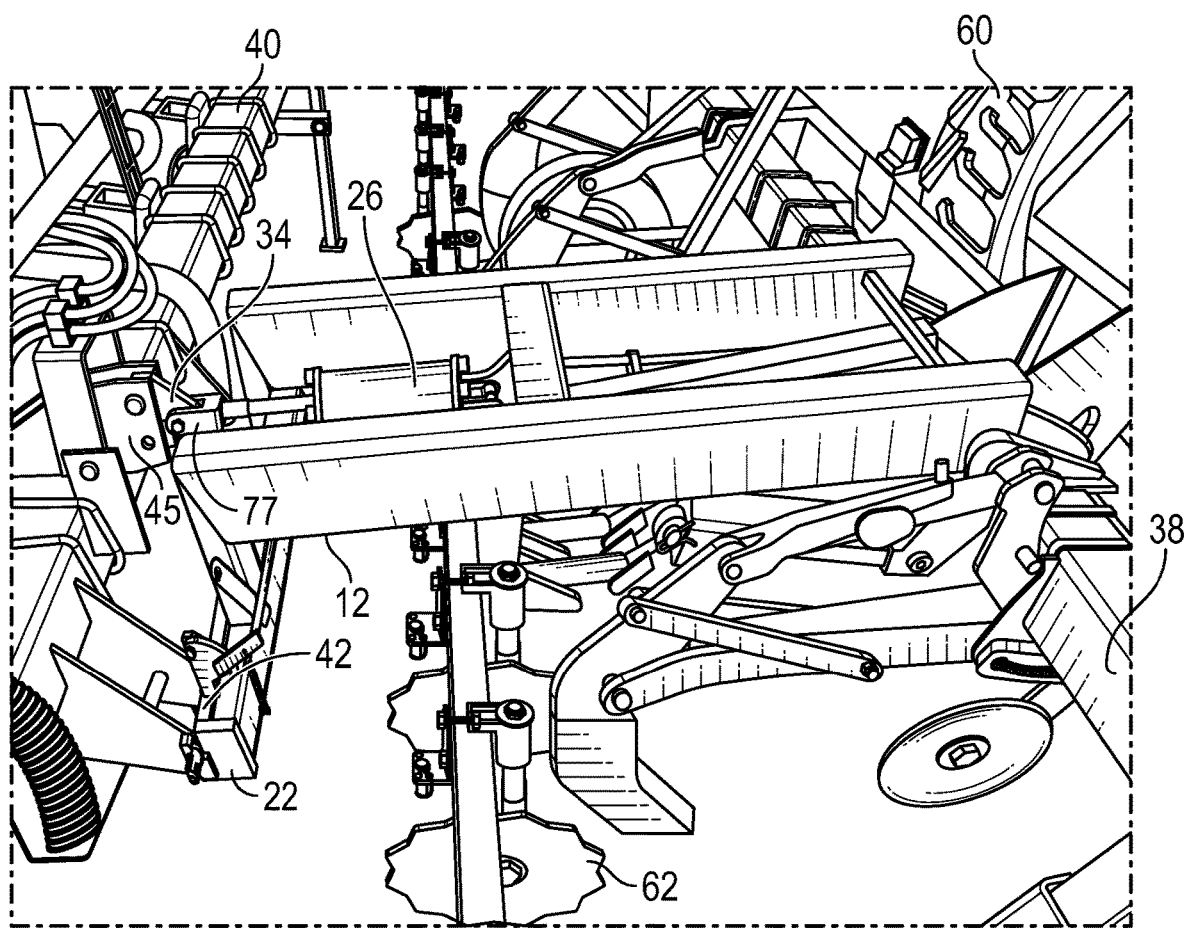
FIG. 8 shows a perspective view of a quick-attachment system being used to attach an agricultural planter to a strip till hitched to a tractor in accordance with the present disclosure.
Figure 9:
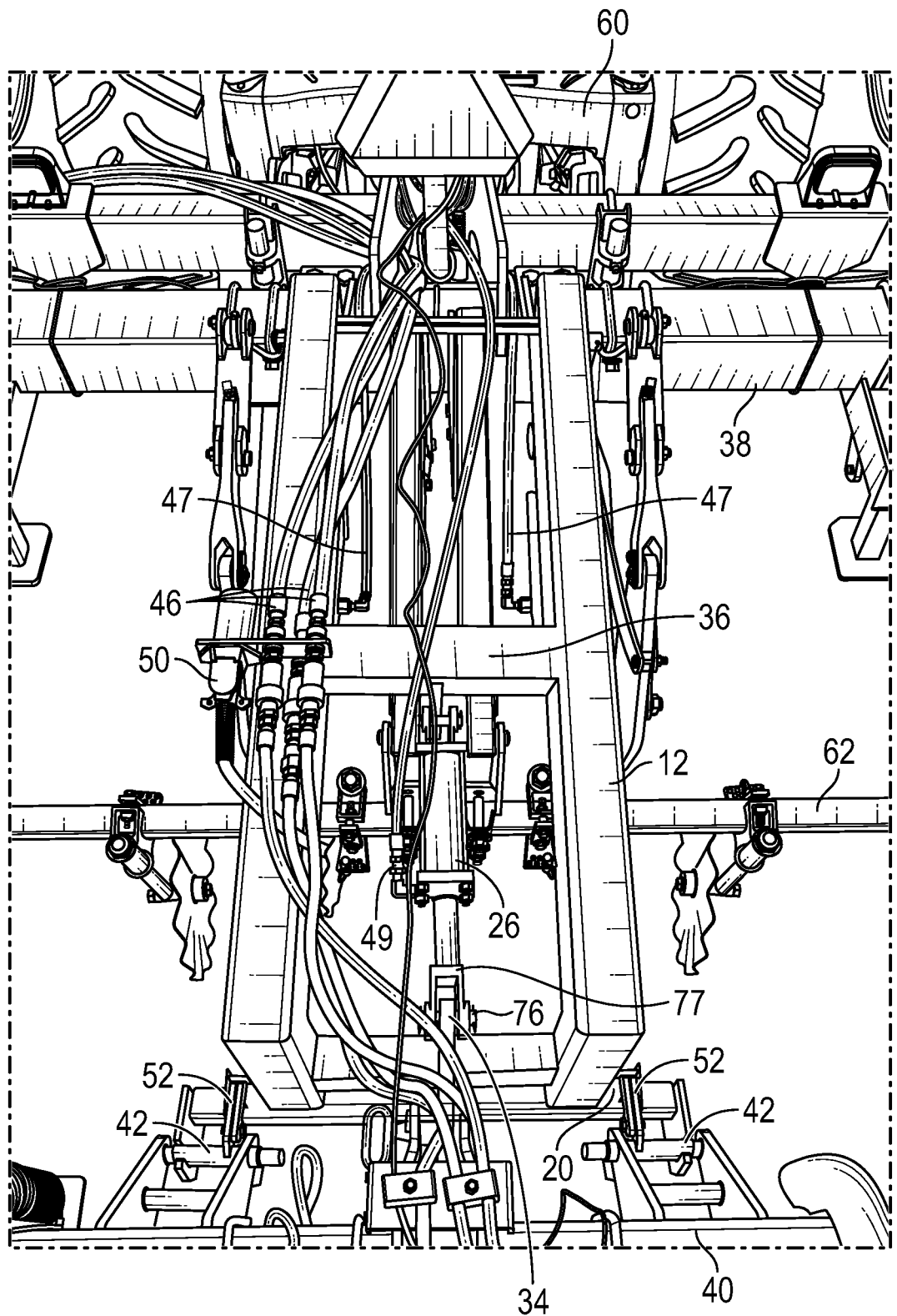
FIG. 9 shows a perspective view of a quick-attachment system being used to attach an agricultural planter to a strip till hitched to a tractor in accordance with the present disclosure.
Figure 10:
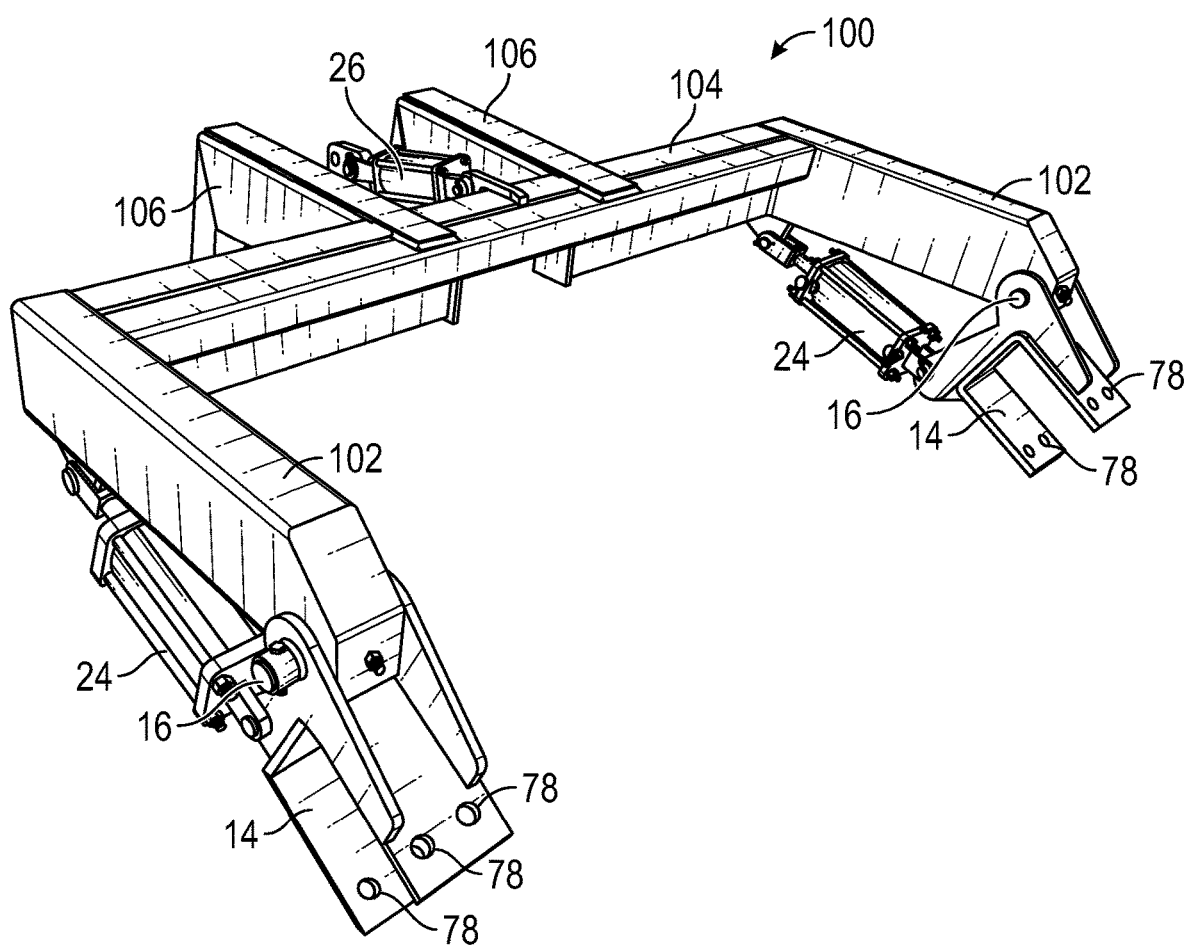
FIG. 10 shows a perspective view of a frame for quick attachment of farming implements in accordance with the present disclosure.
Figure 11:
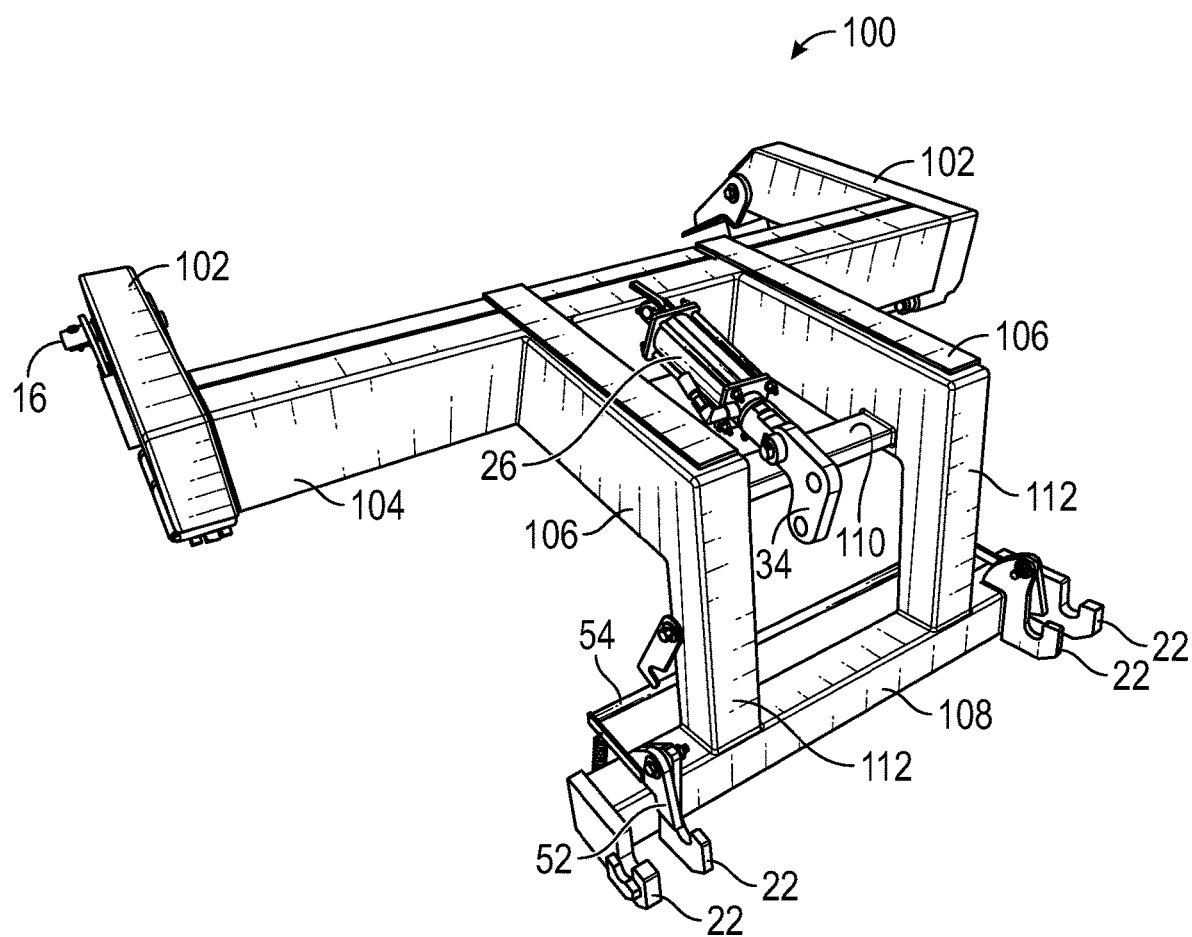
FIG. 11 shows a perspective view of a frame for quick attachment of farming implements in accordance with the present disclosure.

A farming implement quick-attachment system 10 and a method of using the quick-attachment system to attach farming implements are provided. The system 10 comprises a rigid frame 12 that may be semi-permanently or permanently attached to a farming implement 38 and then used to quickly attach a second farming implement 40 to the first farming implement and then also quickly detach the second implement from the first implement on an as-needed basis with minimal downtime. In a preferred embodiment, the present system may be utilized to attach an agricultural planter 40 to a tillage tool, such as a strip till 62, that is hitched to a tractor 60. FIGS. 1-4 illustrate one preferred embodiment of the frame 12 before installation on a strip till 62 and attachment of a planter 40 to the frame 12. FIGS. 5-9 illustrate the frame 12 installed on a strip till 62 and being used to attach a planter 40 to the strip till 62 so that the two farming implements may be utilized in combination for simultaneous tilling and planting operations. FIGS. 10-11 illustrate another preferred embodiment of a frame 100 that may also be utilized.

Figure 1:
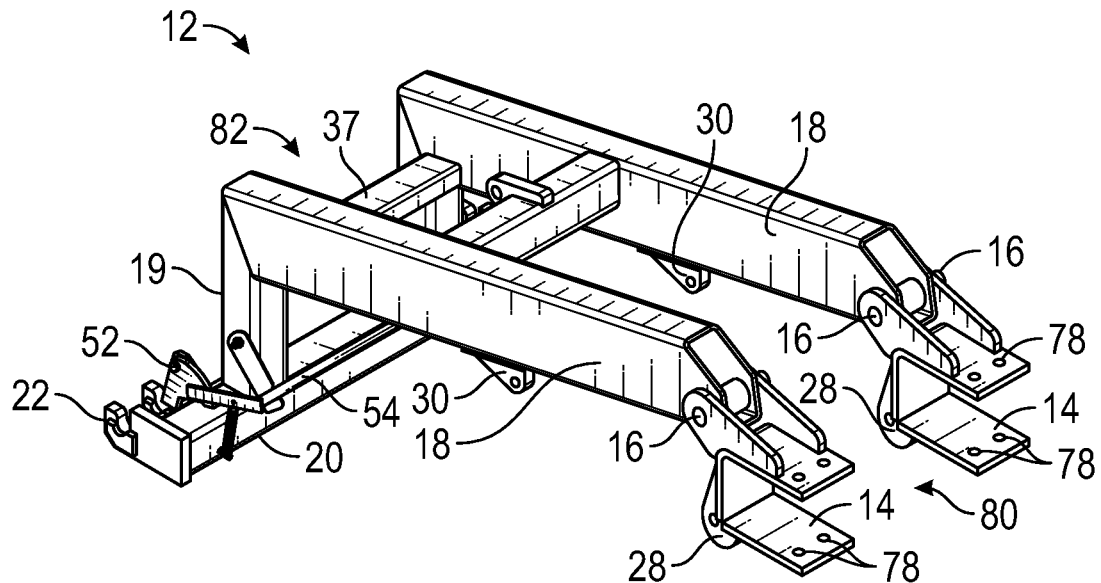
FIG. 1 shows a perspective view of a frame for quick attachment of farming implements in accordance with the present disclosure.
Figure 2:
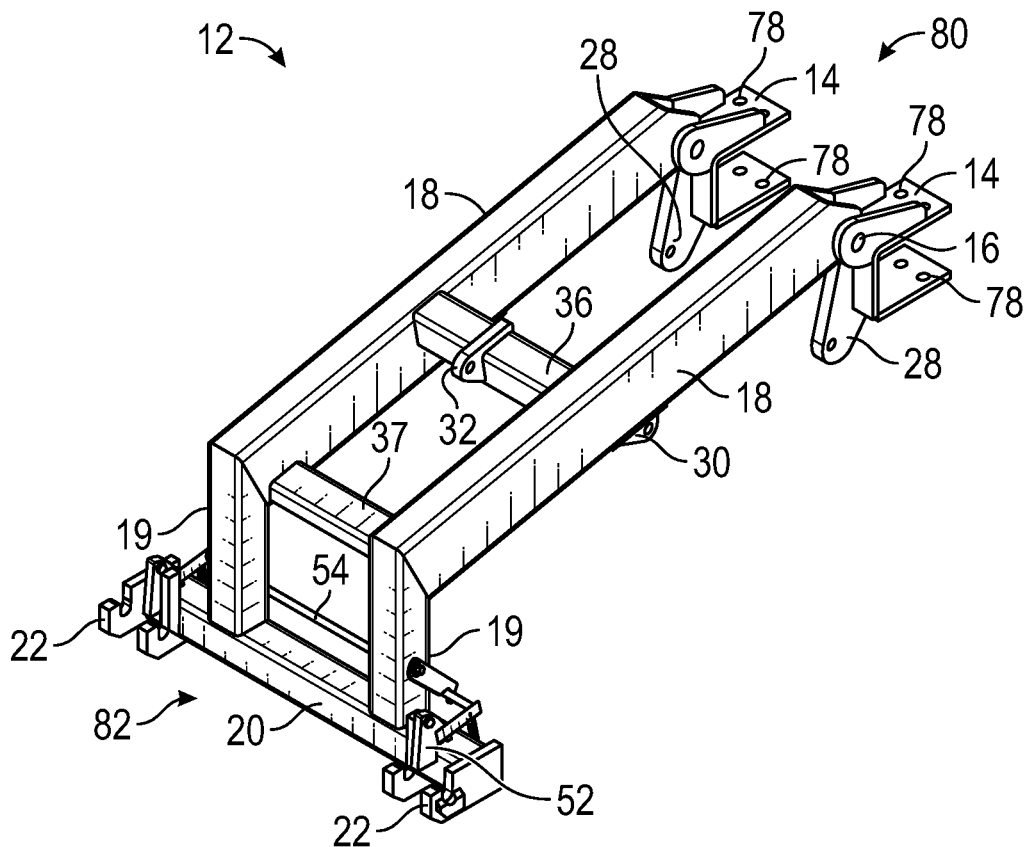
FIG. 2 shows a perspective view of a frame for quick attachment of farming implements in accordance with the present disclosure.

The frame 12 has a first end 80 and a second end 82. The frame 12 is rigid and preferably constructed of metal or similar material having sufficient strength to support the weight of a large farming implement such as a planter 40. As best seen in FIGS. 1 and 2, the frame 12 has a plurality of spaced brackets 14 each pivotally coupled to the first end 80 of the frame 12 and configured to fixedly secure each bracket 14 to a toolbar 38 of a first farming implement 62. The frame 12 also has a plurality of spaced attachment elements 22 each attached to the second end 82 of the frame 12 and configured to rotatably secure each attachment element 22 to a second farming implement 40. In a preferred embodiment, the first farming implement is a strip till 62, and the second farming implement is a planter 40.

Figure 4:
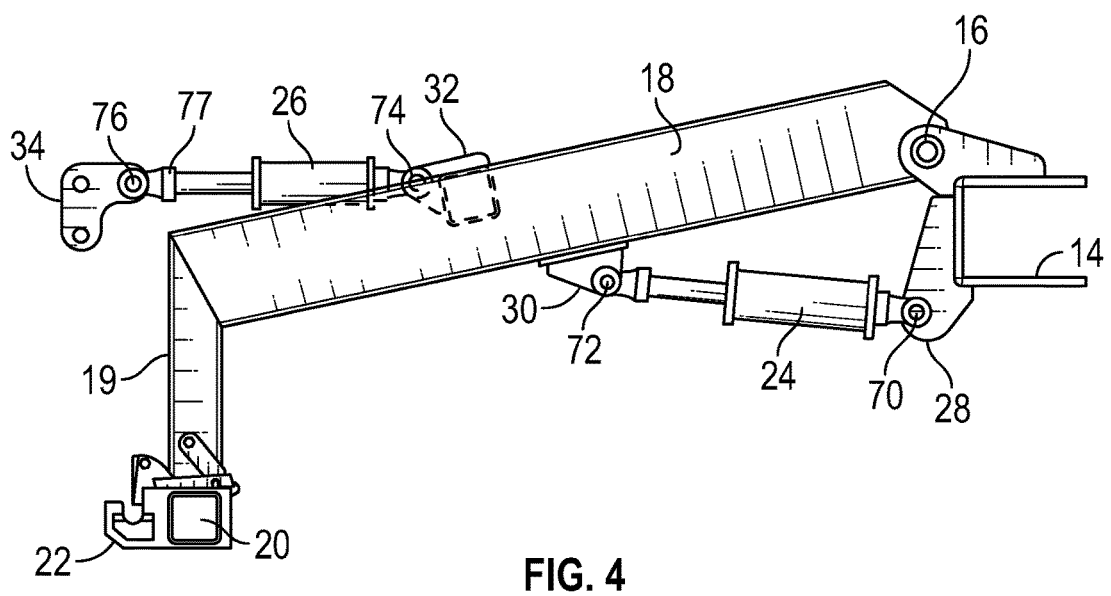
FIG. 4 shows a side elevational view of a frame for quick attachment of farming implements in accordance with the present disclosure.
Figure 5:
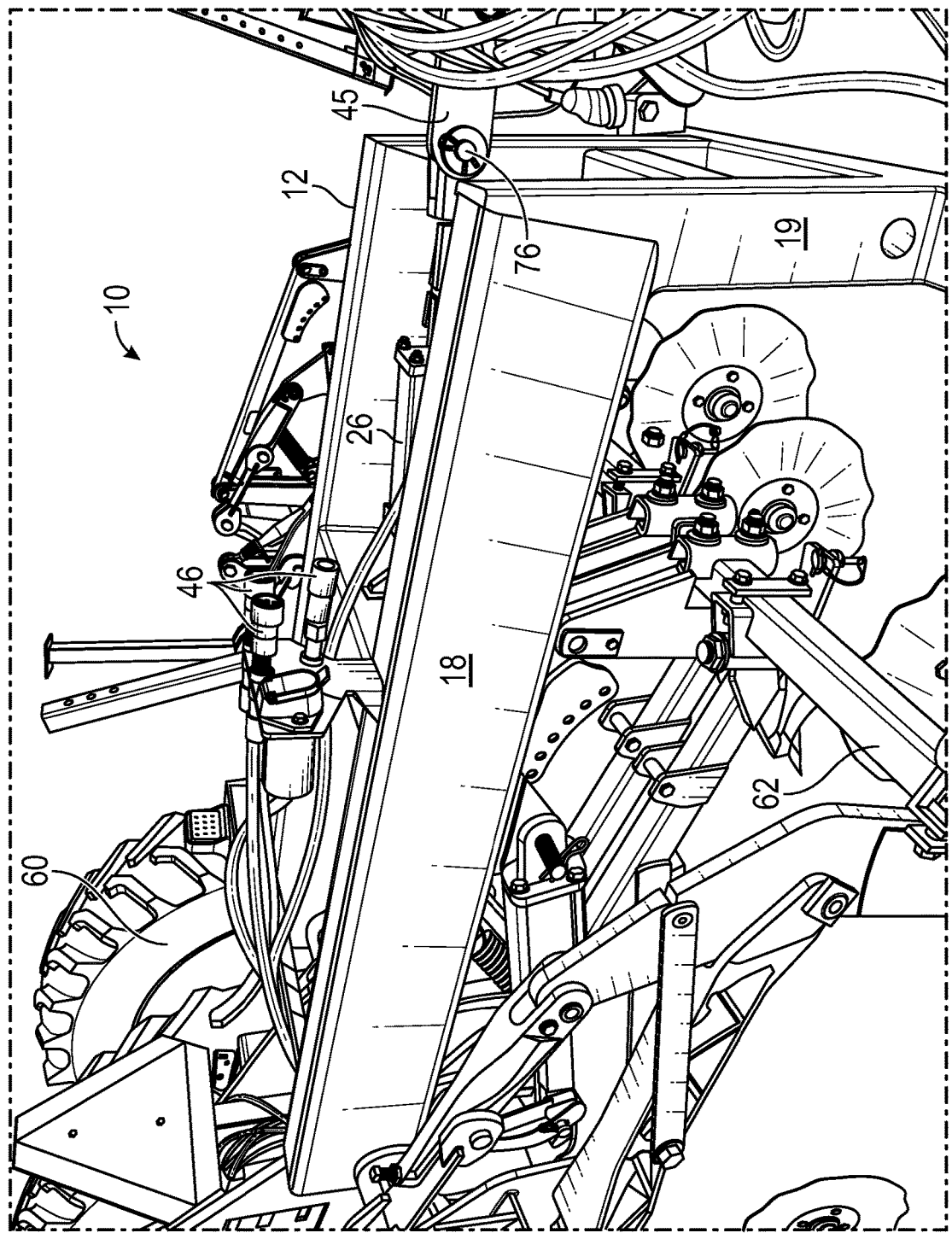
FIG. 5 shows a perspective view of a quick-attachment system being used to attach an agricultural planter to a strip till hitched to a tractor in accordance with the present disclosure.

The system 10 further comprises a bracket hydraulic cylinder 24 coupled to each respective bracket 14 at one end of the cylinder 24 and to the frame 12 at an opposing end of the cylinder 24, as best seen in FIG. 4. The bracket hydraulic cylinders 24 are configured to vertically pivot the frame 12 relative to the first farming implement 62 when the brackets 14 are secured to the toolbar 38 of the first farming implement 62. The brackets 14 are aligned with each other so that each bracket 14 can be secured to the toolbar 38. The system 10 further comprises a frame hydraulic cylinder 26 coupled to the frame 12 at one end of the cylinder 26, which can also be seen in FIG. 4. The frame hydraulic cylinder 26 is configured to connect to the second farming implement 40 at an opposing end of the cylinder 26, as shown in FIGS. 8 and 9. The frame hydraulic cylinder 26 is configured to vertically pivot the second farming implement 40 relative to the frame 12 when the frame 12 is secured to the second farming implement 40. As used herein, "vertically pivot" or grammatical equivalents thereof indicate a component pivoting within a vertical plane oriented in a vertical direction relative to the ground on which the tractor 60 is utilized for farming, which is a direction generally perpendicular to the ground that directly supports the tractor.

Figure 3:
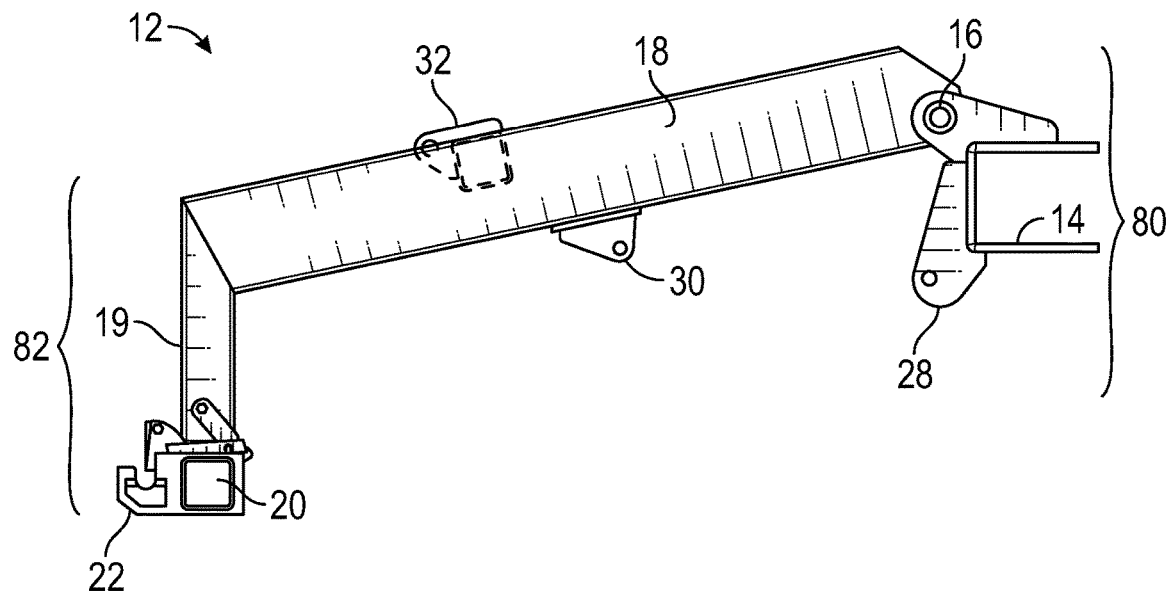
FIG. 3 shows a side elevational view of a frame for quick attachment of farming implements in accordance with the present disclosure.

In a preferred embodiment, as best shown in FIGS. 1-2, the frame 12 comprises two parallel beams 18 attached to each other. The two beams 18 may be rigidly connected to each other by at least one crossbar, and preferably by multiple crossbars 36, 37, 20 for added structural strength. In a preferred embodiment, as best seen in FIG. 2, the parallel beams 18 may be connected by two crossbars 36, 37 that are directly attached to each of the beams 18 and by one lower crossbar 20 having attachment elements 22 attached at opposing ends of the lower crossbar 20 for securing to an agricultural planter 40 or other farming implement. All of the crossbars 36, 37, 20 extend perpendicularly between the beams 18 and are attached to each of the beams 18. The two spaced attachment elements 22 allow the frame 12 to be used as a three-point hitch for hitching the planter 40 to the frame 12. In a preferred embodiment, the parallel beams 18 are each angled downward at an angle slightly greater than 90 degrees, as best shown in FIG. 3, to form two parallel downdrop bars 19 to which the lower crossbar 20 may preferably be attached. As best seen in FIGS. 1-4, in a preferred embodiment, each downdrop bar 19 is longitudinally continuous with a respective one of the beams 18. The downdrop bars 19 are positioned at the second end 82 of the frame 18, which is the end to which the planter 40 is secured to the attachment elements 22. This preferred configuration of the frame 12 provides a structurally strong, rigid connection with both the strip till 62 and the planter 40 that allows for a three-point connection to the planter 40 to be utilized, which helps to provide adequate structural support for hitching the planter 40 to the frame 12. It also provides a configuration that is compatible with a variety of different types of planters. However, it should be understood that other configurations of a rigid frame 12 may be utilized to attach two farming implements to each other and still fall within the scope of the present disclosure.

Figure 6:
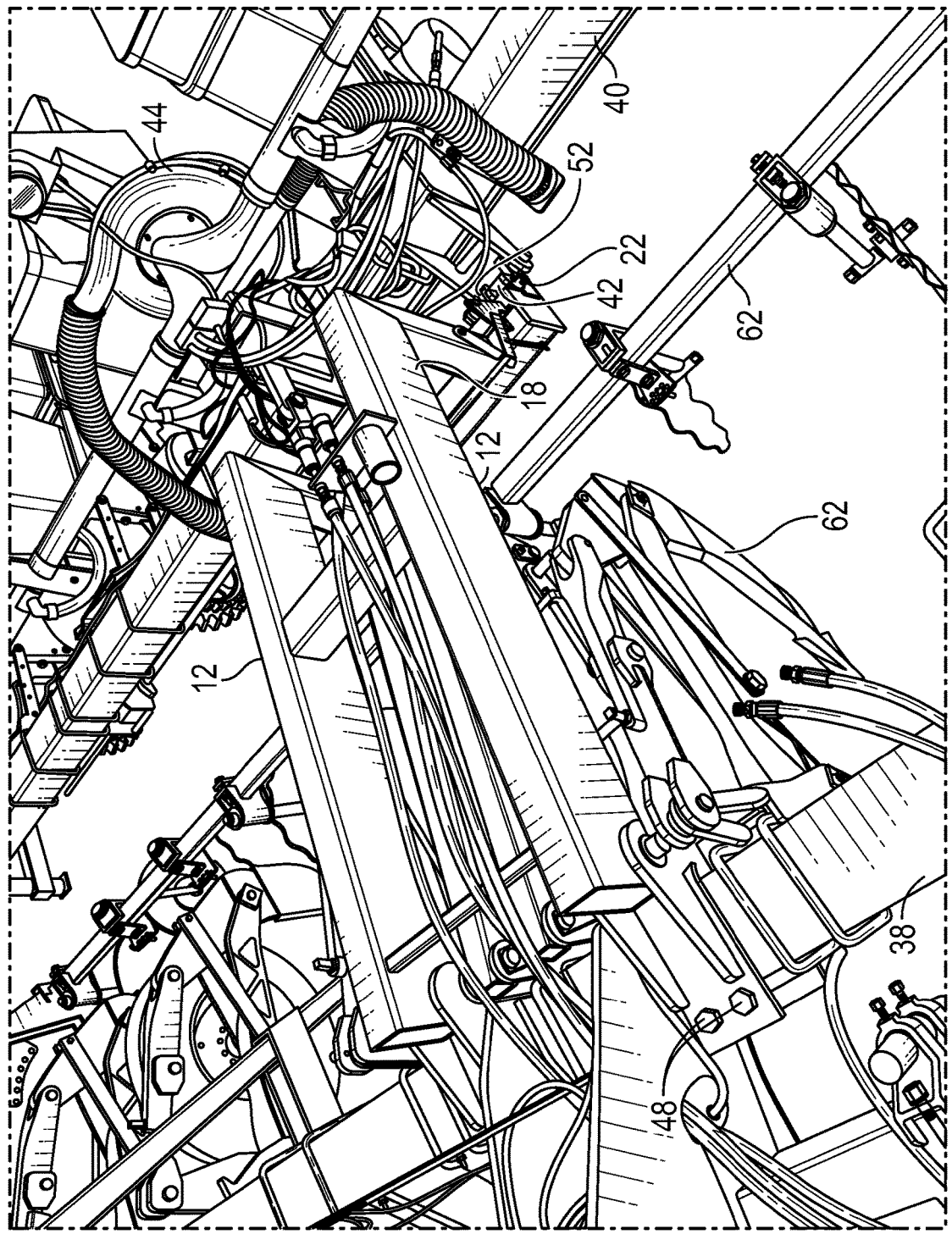
FIG. 6 shows a perspective view of a quick-attachment system being used to attach an agricultural planter to a strip till hitched to a tractor in accordance with the present disclosure.

As best seen in FIGS. 1-2, the frame preferably has one respective bracket 14 pivotally coupled to an end of each respective beam 12, which is at the first end 80 of the frame 12. Each bracket 14 may be pivotally coupled to the frame 12 about a pin 16 that defines a pivot point and extends transversely through the beam 12 and through openings on opposing sides of the bracket 14, as best seen in FIGS. 1 and 6. The pins 16 allow each bracket 14 to pivot vertically relative to the beam 18 in the same longitudinal plane as the beam 18 to which the bracket 14 is coupled. The brackets 14 are preferably C-shaped brackets sized to fixedly secure the bracket 14 to a toolbar 38 of a tiller 62, as best seen in FIG. 6, at two separate attachment points spaced apart along a length of the toolbar 38. Toolbars 38 of farming implements typically have the shape of a square beam, and each C-shaped bracket preferably has a generally rectangular interior shape that can be fitted tightly around the square beam of the toolbar 38 to secure the brackets 14 to the toolbar 38. As shown in FIG. 1, opposing top and bottom sides of each bracket 14 may have holes 78 through which bolts 48 or similar fasteners may be vertically inserted and tightened in place to fixedly secure the brackets 14 to the toolbar 38 of the tiller 62, as best seen in FIG. 6. Each bracket 14 is preferably sized so that the toolbar 38 fits tightly between the bolts 48 and an interior side of each bracket 14. In alternative embodiments, the brackets may have other suitable shapes or configurations in which the brackets are configured to secure to a toolbar of a farming implement and still fall within the scope of the present disclosure.

FIGS. 10 and 11 illustrate a preferred embodiment of an alternative frame 100 in which the frame 100 comprises a first set of two parallel beams 102 attached to each other by a first crossbar 104 that extends perpendicularly between the first set of beams 102. One respective bracket 14 is pivotally coupled to an end of each beam 102. The frame 100 further comprises a second set of two parallel beams 106, which are also parallel to the first set of beams 102. Both beams 106 of the second set of beams are attached to the first crossbar 104 but are positioned closer together than the first set of beams 102. Each of the spaced attachment elements 22 is attached to a second crossbar 108 that extends perpendicularly between the second set of beams 106 and is attached to each of the beams 106 of the second set of beams. This alternative configuration of the frame 100 allows the spacing of the bracket 14 connections to the toolbar 38 and/or the spacing of the attachment element 22 connections to the planter 40 to be adjusted to fit the frame to different strip tills 62 or different planters 40. It should be understood by one skilled in the art that the spacing between the first set beams 102 and/or the second set of beams 106 may be varied and still fall within the scope of the present disclosure. The frame 100 shown in FIGS. 10 and 11 preferably includes two downdrop bars 112 that are each angled downwardly from each of the second set of beams 106 and are each longitudinally continuous with a respective one of the second set of beams 106 so that the frame 100 can be hitched to the planter 40 with a three-point connection. The frame 100 preferably includes an additional crossbar 110 extending between the second set of beams 106 that provides additional structural support for the frame 100 and also functions as a support for the frame hydraulic cylinder 26 when a planter 40 is not attached to the frame 100, in which case the frame hydraulic cylinder 26 may remain connected to the frame 100 and supported by the crossbar 110, as best seen in FIG. 11. On frame 12, crossbar 37 may serve the same function as a support for the frame hydraulic cylinder 26.

Figure 12:
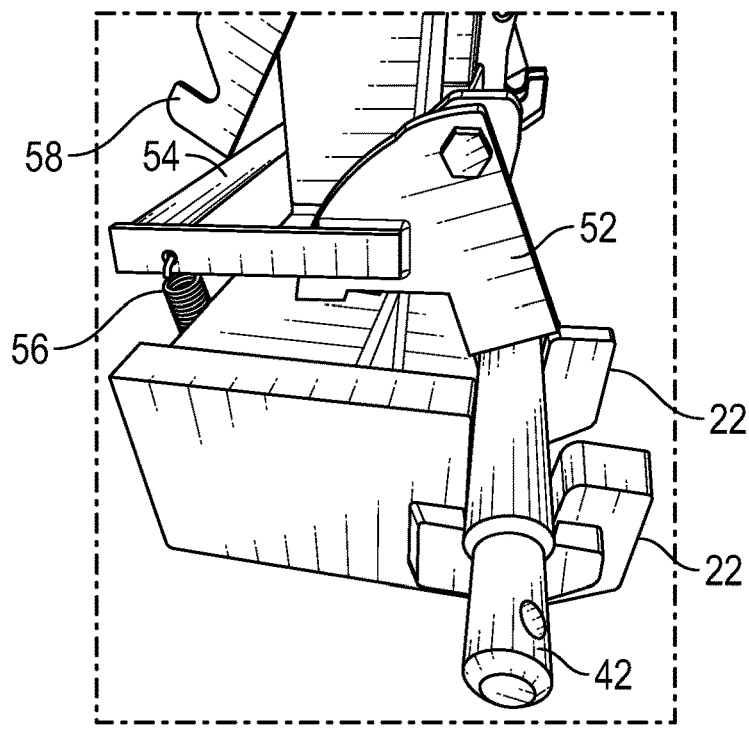
FIG. 12 shows a perspective view of a latching mechanism for attachment of a frame to a farming implement in accordance with the present disclosure.
Figure 13:
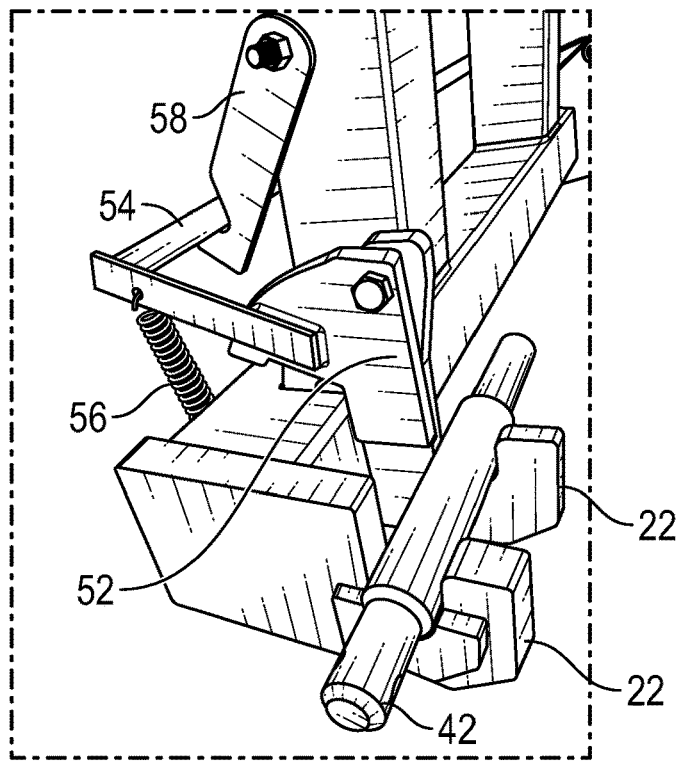
FIG. 13 shows a perspective view of a latching mechanism for attachment of a frame to a farming implement in accordance with the present disclosure.
Figure 14:
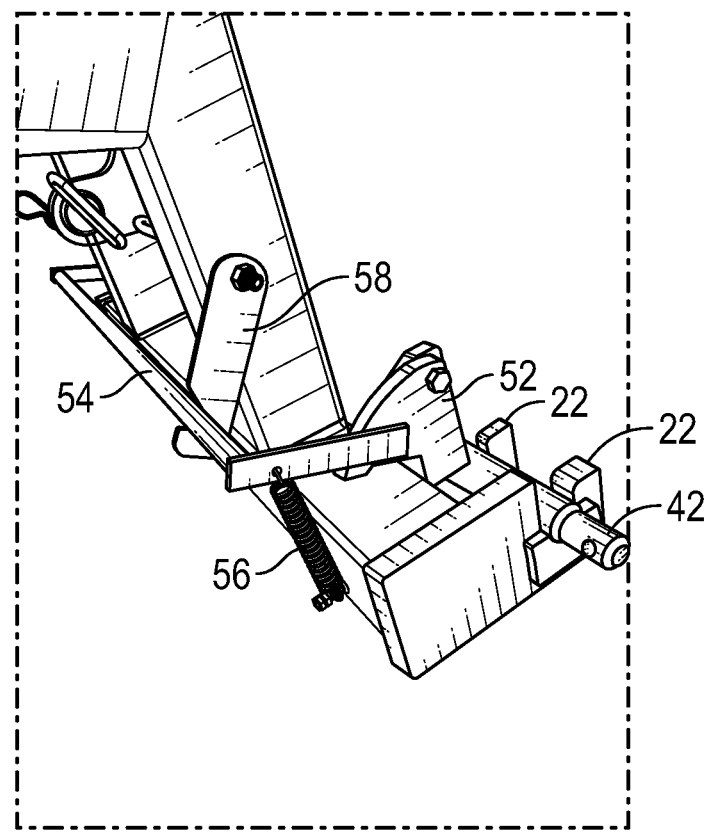
FIG. 14 shows a perspective view of a latching mechanism for attachment of a frame to a farming implement in accordance with the present disclosure.

As best seen in FIG. 2, the frame 12 includes two opposing attachment elements 22 attached to a second end 82 of the frame 12 and a latching mechanism to secure attachment of the planter 40 to the frame 12. FIGS. 12-14 illustrate details of a preferred embodiment of the attachment elements 22 and latching mechanism. Each attachment element 22 is configured to rotatably secure the attachment element 22 to a farming implement, which is preferably an agricultural planter 40. As best seen in FIGS. 1-4, each attachment element preferably comprises a hook 22 with an upwardly facing open end, and preferably two spaced hooks 22. Each attachment element 22 preferably further comprises a latch 52 configured to rotatably secure a horizontal bar 42 of the planter 40 within the hooks 22 of each attachment element. The latch 52 is preferably disposed between the two hooks 22 of each attachment element. The attachment points on the planter 40 for connection to attachment elements 22 typically comprise a horizontal bar 42, which may be set within the hooks 22 on the frame 12 and then secured in place by each latch 52, as best seen in FIG. 12, to secure the planter 40 to the attachment elements 22 of the frame 12. The horizontal bars 42 forming the attachment points on the planter 40 are then free to rotate within each of the hooks 22 when the planter 40 is vertically pivoted as needed during normal operation of the system 10 to lift or lower the planter 40 relative to the frame 12.

In a preferred embodiment, the latch 52 may be pivoted between latched and unlatched positions. FIG. 12 shows the latch 52 in the latched position in which the bar 42 is secured to the attachment element 22, and FIGS. 13 and 14 show the latch 52 in the unlatched position in which the bar 42 can be removed from the attachment element 22. In a preferred embodiment, the system 10 comprises a latch bar 54 attached to two latches 52 and configured to simultaneously move both latches 52 between the latched and unlatched positions. The latches 52 are preferably pivotally attached to the frame 12, and the latch bar 54 is preferably biased toward a downward position by one or more springs 56 that may be attached to the latch bar 54 and to the lower crossbar 20. When the latch bar 54 is allowed to moved downward, the latch 52 pivots to the latched position and bar 42 cannot be removed. To move the latch 52 to the unlatched position, the latch bar 54 can be lifted against the force of the spring 56 to pivot the latch 52 to the unlatched position. As best seen in FIG. 13, a retaining hook 58 may be pivotally attached to one or both downdrop bars 19 and may be used to retain the latch bar 54 in the lifted position against the force of the spring 56, which holds the latch 52 in the unlatched position so that bar 42 can be removed in order to detach the planter 40 from the frame 12. When the planter 40 is not attached to the frame 12, the latch bar 54 may be allowed to remain in the downwardly biased latched position. The planter 40 may then be attached to the attachment elements 22 by forcibly contacting the bars 42 of the planter 40 against a front side of each latch 52, which forces the latches 52 to pivot toward the unlatched position against the force of the springs 56 until the bars 42 drop down into the hooks 22. When the bars 42 are positioned inside the hooks 22, the force of the spring 56 will cause the latches 52 to pivot back to the latched position, in which the bars 42 are then rotatably secured within the hooks 22 so that the planter 40 cannot become unhitched from the frame 12. FIGS. 12-14 illustrate one embodiment of the latch, though it should be understood by one skilled in the art that any suitable type of latching mechanism may be utilized and still fall within the scope of the present disclosure.

As best seen in FIGS. 4 and 10, the system 10 further comprises a bracket hydraulic cylinder 24 coupled to each respective bracket 14 at one end on the cylinder 24 and to the frame 12 at an opposing end of the cylinder 24. The system 10 further comprises a frame hydraulic cylinder 26 coupled to the frame 12 at one end of the cylinder 26 and disposed in a position for connecting an opposing end of the frame hydraulic cylinder 26 to the planter 40. The frame hydraulic cylinder 26 is configured to connect to the planter 40 at the opposing end of the cylinder 26. In a preferred embodiment, the system 10 comprises a total of three hydraulic cylinders: one frame hydraulic cylinder 26 and two bracket hydraulic cylinders 24. The two bracket hydraulic cylinders 24 may each be coupled to one respective bracket 14 at an attachment point 28 on the bracket 14 and also to an attachment point 30 on each respective beam 18 of the frame 12, as best seen in FIGS. 1-4. Attachment point 28 preferably comprises a planar element attached to a side of the bracket 14 generally opposite the open end of the bracket 14 and in a vertical position that is aligned with a longitudinal axis of the beam 18 to which the bracket 14 is coupled. Attachment point 30 preferably comprises a planar element attached to an underside of the beam 18 to which the bracket 14 is coupled and also in a vertical position that is aligned with a longitudinal axis of the beam 18 to which the bracket 14 is coupled. Each of the attachment points 28 and 30 preferably has an opening extending through the planar element of the attachment point, as best seen in FIGS. 2 and 3, for coupling a hydraulic cylinder 24 to the attachment point.

Due to the pivoting brackets 14, the positioning of the attachment points 28 and 30 allows the bracket hydraulic cylinders 24 to vertically pivoting the frame 12 relative to the brackets 14 and thus relative to the strip till 62 to which the brackets 14 are securely fastened. The two bracket hydraulic cylinders 24 work in concert to lift and lower the frame 12 relative to the toolbar 38 of the strip till 62 and may thus be preferably supplied with hydraulic fluid from a single fluid line that splits to each of the two cylinders 24. In a preferred embodiment, one end of each bracket hydraulic cylinder 24 is pivotally coupled to each respective bracket 14 at attachment point 28, and an opposing end of the bracket hydraulic cylinder 24 is pivotally coupled to the frame 12 at attachment point 30. As best seen in FIG. 4, opposing ends of each bracket hydraulic cylinder 24 may pivot about a pin 70, 72 inserted through the openings of attachment points 28 and 30, respectively. The pins 70, 72 are positioned transverse to the longitudinal axis of the beam 18 and to the direction of movement of the piston rod of the bracket hydraulic cylinder 24. When the piston rod of the cylinder 24 extends and retracts, the pins 70, 72 allow the ends of the cylinder 24 to pivot about the pins in order to allow smooth vertical pivoting of the frame 12 relative to the brackets 14 and the strip till 62.

In a preferred embodiment, the frame hydraulic cylinder 26 may be coupled at one end of the cylinder 26 to the frame 12 at an attachment point 32 on a crossbar 36 extending perpendicularly between the parallel beams 18 and attached to each of the beams 18. Attachment point 32 is preferably positioned at a laterally centered position of the frame 12, which is a point midway between the two parallel beams 18. The opposing end of the frame hydraulic cylinder 26 is configured to connect to the planter 40. The opposing end of the frame hydraulic cylinder 26 may be coupled to a planter bracket 34, as shown in FIG. 4, that is configured for attachment to the planter 40, or it may be coupled directly to the planter 40. Attachment point 32 preferably comprises a planar element attached to the crossbar 36 and in a vertical position that is parallel to a longitudinal axis of each beam 18. Attachment point 32 preferably has an opening extending through the planar element of the attachment point, as best seen in FIG. 2, for coupling the frame hydraulic cylinder 26 to the attachment point 32, as shown in FIG. 4. In a preferred embodiment, one end of the frame hydraulic cylinder 26 is pivotally coupled to the frame 12 at attachment point 32, and an opposing end of the frame hydraulic cylinder 26 is pivotally coupled to the bracket 34. As best seen in FIG. 4, opposing ends of the frame hydraulic cylinder 26 may pivot about a pin 74, 76 inserted through the openings of attachment point 32 and bracket 34, respectively. The pins 74, 76 are positioned transverse to the longitudinal axis of the beam 18 and to the direction of movement of the piston rod of the frame hydraulic cylinder 26. When the piston rod of the cylinder 26 extends and retracts, the pins 74, 76 allow the ends of the cylinder 26 to pivot about the pins in order to allow smooth vertical pivoting of the planter 40 relative to the frame 12. As the planter 40 is pivoted by the action of the frame hydraulic cylinder 26, the horizontal bars 42 of the planter 40 remain secured within the hooks 22 attached to the frame 12 and rotate within the hooks 22 to allow upward and downward pivoting of the planter about the bars 42 secured to the attachment elements 22.

As shown in FIG. 4, the bracket 34 may remain connected to the frame hydraulic cylinder 26, or it may remain connected to the planter 40. In a preferred embodiment, the piston rod of cylinder 26 has a connector 77 configured to connect to vertically positioned bracket 34. The connector 77 preferably has two spaced elements with openings through each element so that pin 76 can be inserted through both openings and through an opening in bracket 34, as best seen in FIGS. 8 and 9. As best seen in FIG. 8, bracket 34 may then be attached to an attachment point 45 on the planter 40, which is preferably positioned at a center point of the planter 40. Cylinder 26 may then pivot about pin 76. In a preferred embodiment, a single frame hydraulic cylinder 26 is utilized. The frame hydraulic cylinder 26 is coupled to attachment point 32 in a laterally centered position on the frame 12 so that the frame hydraulic cylinder 26 connection to the planter 40 functions as a center link for a three-point hitch, which includes attachment elements 22, that attaches the planter 40 to the frame 12. Because the planter attachment bars 42 may rotate within the hooks 22 of the frame 12, the planter hydraulic cylinder 26 is thus configured for vertically pivoting the planter 40 relative to the frame 12. Thus, both of the frame 12 and the planter 40 may be independently vertically pivoted relative to the strip till 62 by utilizing the frame hydraulic cylinders 24 and/or the planter hydraulic cylinder 26. This allows the planter 40 to be lifted out of the way when necessary, such as when the planter 40 is not in use when the tractor 60 is making a turn to make an additional pass over the field or when pulling the strip till 62 and planter 40 over uneven terrain.

In a preferred embodiment, as best seen in FIG. 9, the system 10 further comprises a plurality of hydraulic hoses, wherein a hydraulic hose 49 is operably connected to the frame hydraulic cylinder 26, and a hydraulic hose 47 is operably connected to each respective bracket hydraulic cylinder 24. In a preferred embodiment, the plurality of hydraulic hoses includes hoses 46, 47, 49 that are each respectively configured to individually couple to a hydraulic system of the tractor 60 at one end of each hose and to a respective one of the hydraulic cylinders 24, 26 or to a hydraulic system of the planter 40 at an opposing end of each hose, as best shown in FIG. 9. In a preferred embodiment, the system 10 comprises two separate hydraulic hoses 47 and 49 that may be used to hydraulically link the tractor 60 to the frame 12 and an additional plurality of hoses 46 linking the tractor to a vacuum system 44 of the planter 40, which may be seen in FIG. 6. Hydraulic hose 47 may preferably split (not shown) into two hoses each coupled to one respective bracket hydraulic cylinder 24, as shown in FIG. 9. Hydraulic hose 49 is coupled to the frame hydraulic cylinder 26, as is also shown in FIG. 9. This allows the two bracket hydraulic cylinders 24 to be used as a combination unit independently from the frame hydraulic cylinder 26 and vice versa. The hydraulic cylinders 24, 26 are preferably single-acting cylinders each having only one hydraulic hose connection, which is configured to use hydraulic pressure to move the piston rod of each cylinder 24, 26 in a direction to lift the frame 12 or the planter 40, respectively, while the force of gravity may allow the frame or the planter to be lowered.

Figure 7:
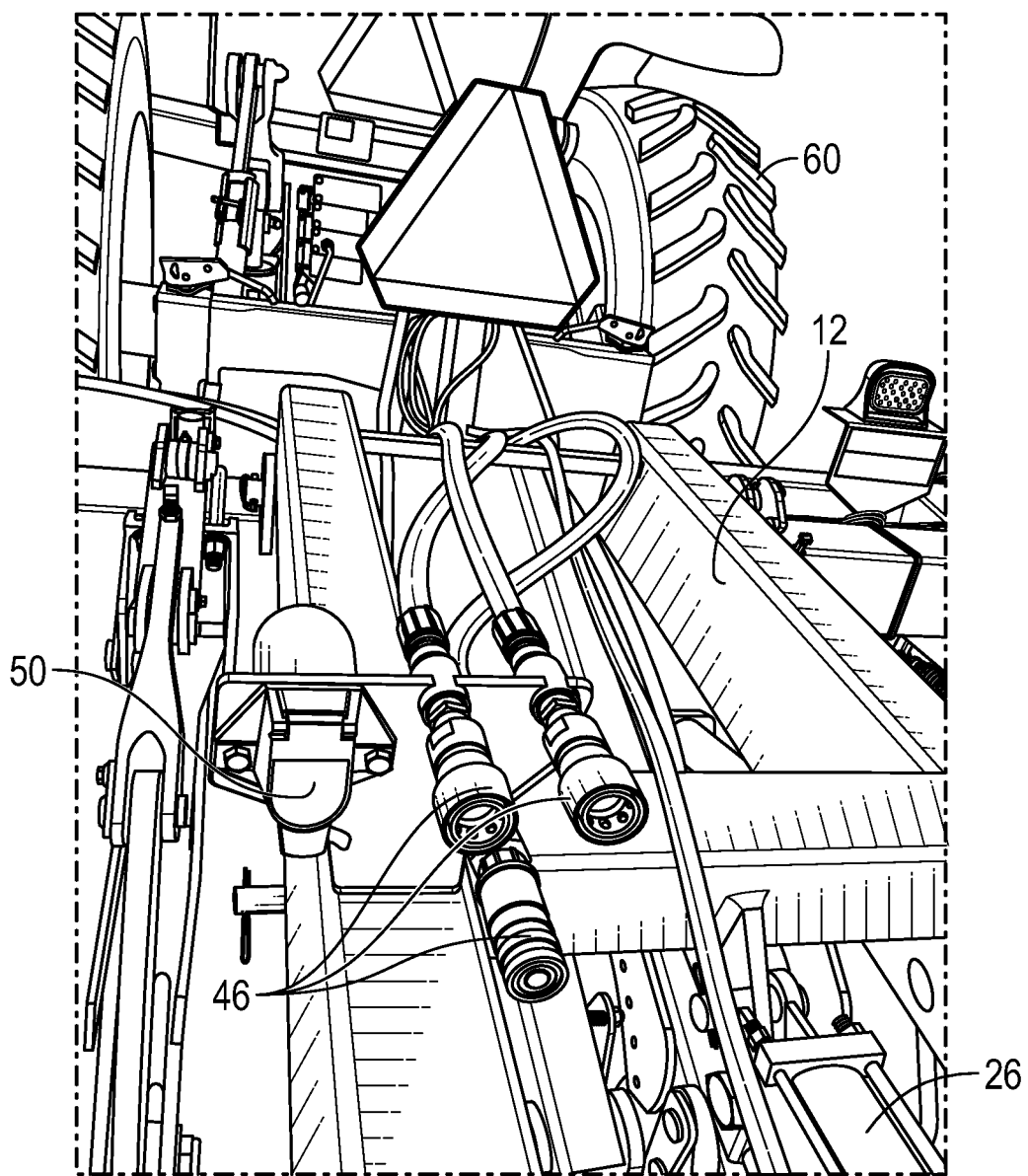
FIG. 7 shows a perspective view of a quick-attachment system being used to attach an agricultural planter to a strip till hitched to a tractor in accordance with the present disclosure.

The remaining hydraulic hoses 46 may be coupled to existing hydraulic hoses of the vacuum system 44 of the planter 40. FIG. 7 illustrates the hydraulic hoses 46 of the system before connecting to the planter 40, and FIG. 9 illustrates the hydraulic hoses 46 of the system after connecting to the existing planter hydraulic hoses. Thus, the present system may be utilized to connect the hydraulic system of the planter 40 to the hydraulic system of the tractor 60 through the hydraulic hoses 46 of the quick-attachment system 10 so that the hydraulic system of the planter 40 is fully operational through normal controls of the hydraulic system of the tractor 60. This eliminates the need to install new hydraulic hoses ad hoc to connect the two hydraulic systems for central control through the tractor controls. The present system also allows the hydraulic cylinders 24 and 26 coupled to the frame 12 to be controlled through normal controls of the hydraulic system of the tractor 60. The system 10 preferably also includes a pre-installed wiring harness 50 to which lighting on the planter 40 may be connected, as shown in FIG. 9, so that lighting on the planter 40 may be controlled through normal lighting controls on the tractor 60.

To use the quick-attachment system, the frame 12 is preferably initially installed on the strip till 62 on at least a semi-permanent basis, meaning that the frame 12 may remain on the strip till 62 indefinitely and still allow normal use of the strip till 62 with or without a planter 40 attached to the frame 12 but may also be removed from the strip till 62 as necessary, which is typically infrequently, such as for certain types of maintenance or when selling a strip till and desiring to separately retain the quick-attachment system 10. The strip till 62 is fully functional with the frame 12 attached to the strip till 62 and thus normal tilling operations never require removal of the frame 12 from the strip till 62. During initial installation of the frame 12 onto the strip till 62, the frame 12 is set in place for attachment to the strip till 62, and the brackets 14 may then be fixedly secured to the toolbar 38 of the strip till 62 by fastening the brackets 14 to the toolbar 38 using bolts 48. Next, the bracket hydraulic cylinders 24 may be installed by coupling each end of each cylinder 24 to attachment points 28 and 30 of the frame 12, and the frame hydraulic cylinder 26 may be coupled to attachment point 32 of the frame (during initial installation of the system on the strip till 62, the opposing end of the frame hydraulic cylinder 26 may remain disconnected from the planter 40). The hydraulic cylinders 24, 26 may be connected to the attachment points 28, 30, 32 using pins 70, 72, 74 and fasteners to retain the pins so that each cylinder 24, 26 may pivot vertically about the pins at each attachment point 28, 30, 32. Once the cylinders 24, 26 are installed, the hydraulic hoses 47, 49 may be coupled to hydraulic hose couplings on the tractor 60 and to the cylinders 24, 26 to provide hydraulic fluid to the cylinders 24, 26 from the hydraulic system of the tractor 60. Initial installation of the frame 12 and hydraulic cylinders 24, 26 is then complete. The strip till 62 may then be utilized independently (without the planter 40 attached) with the frame 12 attached to the strip till 62 and the cylinders 24, 26 attached to the frame 12 without affecting operation of the strip till 62. Thus, the frame 12 with all hydraulic cylinders 24, 26 installed thereon may remain permanently installed on the strip till 62. Then, if it is desired to attach a planter 40 to the strip till 62, the planter 40 may be quickly and easily attached to the pre-installed frame 12 of the quick-attachment system 10 on an as-needed basis.

To secure the planter 40 to the strip till 62 for combination tilling and planting operations, the planter 40 is secured to the attachment elements 22 on the frame 12, preferably by positioning horizontal bars 42 of the planter 40 within the hooks 22 and then securing the bars 42 in place with latches 52, as shown FIGS. 6, 9, and 12. The bars 42 of the planter 40 are then free to rotate within each of the hooks 22 when the planter 40 is vertically pivoted as needed during normal operation. Next, the frame hydraulic cylinder 26 is connected to the planter 40 at an attachment point 45 on the planter 40, preferably by fastening bracket 34 to attachment point 45, as shown in FIG. 8. A pin 76 and a fastener to retain the pin 76 may be utilized to couple the cylinder 26 to the bracket 34 so that the cylinder 26 may pivot about pin 76. Next, existing hydraulic hoses on the planter 40 are coupled to the hydraulic hoses 46 of the present system 10, as shown in FIG. 9, to provide control of the planter's hydraulic system through the tractor controls. Lastly, the planter wiring for lighting may be connected to the wiring harness 50 of the present system 10 to complete the installation. Thus, after initial installation of the frame 12 onto the strip till 62, the planter 40 may be quickly attached to the strip till 62 simply by completing a three-point hitch to the frame 12 (including latching the planter 40 at two points to the two opposing attachment elements 22 of the frame 12 and coupling the frame hydraulic cylinder 26 to the planter attachment point 45 to form a center link between the frame 12 and planter 40) and then connecting the planter's existing hydraulic hoses to the hydraulic hoses 46 of the quick-attachment system 10. The planter wiring for lighting may also be connected to the wiring harness 50 of the present system 10. This process generally only takes a few minutes to complete and may be easily reversed to remove the planter 40 for separate use of the strip till 62 without the planter. Thus, because the frame 12 will normally remain attached to the strip till 62 at all times, the system 10 may be utilized to quickly and easily attach a planter 40 to or detach a planter from the strip till 62. Thus, a farmer can quickly and easily switch between using a strip till 62 in combination with a planter 40 or using the strip till 62 separately without the planter 40, thereby providing flexibility in farming operations and increasing efficiency.

With the planter 40 attached for combination use, the bracket hydraulic cylinders 24 and/or the frame hydraulic cylinder 26 may be placed in a "float" position to allow the pistons of the bracket hydraulic cylinders 24 and/or the frame hydraulic cylinder 26 to move back and forth during normal use as the strip till 62 and planter 40 move over the ground. The tractor's hydraulic control system may then be used to pressurize the cylinders 24, 26 to lift the planter 40 off the ground as needed. For instance, the bracket hydraulic cylinders 24 may be utilized independently of the frame hydraulic cylinder 26 to vertically pivot the frame 12 upward, which will also lift the planter 40. When moving over highly uneven ground, the frame hydraulic cylinder 26 may also be utilized in conjunction with the bracket hydraulic cylinders 24 to pivot the planter 40 upward in order to lift the back end of the planter 40 higher off the ground. Alternatively, the frame hydraulic cylinder 26 may be utilized independently to vertically pivot the planter 40 upward and downward as needed.

The present quick-attachment system 10 may be utilized with a Model 6700 Series strip till machine 62 manufactured by Kelley Manufacturing Company. It should be understood that the configuration and/or dimensions of the frame 12 may be adjusted for use with other types of strip tills or other tillage tools and still fall within the scope of the present disclosure. The present system is generally compatible with a wide variety of commercially available agricultural planters 40, though the configuration and/or dimension of the frame 12 may be adjusted for use with various types of planters and still fall within the scope of the present disclosure.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A farming implement attachment system comprising:
   a rigid frame having a first end and a second end, wherein the frame comprises two generally parallel beams attached to each other;
   a plurality of spaced brackets, wherein each respective one of the brackets is pivotally coupled to an end of a respective one of the beams at the first end of the frame, wherein each bracket is configured to fixedly secure the bracket to a toolbar of a first farming implement;

a plurality of spaced attachment elements, wherein each attachment element is attached to the second end of the frame and configured to rotatably secure the attachment element to a second farming implement, wherein each of the spaced attachment elements is attached to a crossbar that extends between the beams and is attached to each of the beams;

a bracket hydraulic cylinder coupled to each respective bracket at one end of the cylinder and to the frame at an opposing end of the cylinder, wherein the bracket hydraulic cylinders are configured to vertically pivot the frame relative to the first farming implement when each bracket is secured to the toolbar of the first farming implement; and a frame hydraulic cylinder coupled to the frame at one end of the cylinder, wherein the frame hydraulic cylinder is configured to connect to the second farming implement at an opposing end of the cylinder, and wherein the frame hydraulic cylinder is configured to vertically pivot the second farming implement relative to the frame when the frame is secured to the second farming implement.

2. The farming implement attachment system of claim 1, further comprising a plurality of hydraulic hoses, wherein one respective hydraulic hose is operably connected to the frame hydraulic cylinder and to each bracket hydraulic cylinder.

3. The farming implement attachment system of claim 1, wherein each of the plurality of spaced brackets comprises a C-shaped bracket sized to fixedly secure the bracket to a toolbar having the shape of a square beam, wherein the C-shaped bracket has a generally rectangular interior shape, wherein a top side and an opposing bottom side of the C-shaped bracket have bolt holes configured for fastening the C-shaped bracket to the toolbar with bolts.

4. The farming implement attachment system of claim 1, wherein each of the plurality of spaced attachment elements comprises a hook with an upwardly facing open end.

5. The farming implement attachment system of claim 4, wherein each of the plurality of spaced attachment elements further comprises a latch configured to rotatably secure a horizontal bar of the second farming implement within the hook of the attachment element.

6. The farming implement attachment system of claim 1, wherein each bracket hydraulic cylinder is pivotally coupled to a respective one of the brackets at one end of the cylinder and pivotally coupled to a respective one of the beams at an opposing end of the cylinder.

7. The farming implement attachment system of claim 1, wherein the frame hydraulic cylinder is pivotally coupled to the frame at one end of the cylinder.

8. The farming implement attachment system of claim 1, wherein the frame hydraulic cylinder is connected to an attachment point of the frame, wherein the attachment point is attached to a second crossbar at a position that is centered between the beams.

9. A method of attaching farming implements, wherein the method comprises the steps of:
providing a farming implement attachment system comprising:
a rigid frame having a first end and a second end, wherein the frame comprises two generally parallel beams attached to each other, a plurality of spaced brackets, wherein each respective one of the brackets is pivotally coupled to an end of a respective one of the beams at the first end of the frame, wherein each bracket is configured to fixedly secure the bracket to a toolbar of a first farming implement, a plurality of spaced attachment elements, wherein each attachment element is attached to the second end of the frame and configured to rotatably secure the attachment element to a second farming implement, wherein each of the spaced attachment elements is attached to a crossbar that extends between the beams and is attached to each of the beams, a bracket hydraulic cylinder coupled to each respective bracket at one end of the cylinder and to the frame at an opposing end of the cylinder, wherein the bracket hydraulic cylinders are configured to vertically pivot the frame relative to the first farming implement when each bracket is secured to the toolbar of the first farming implement, and a frame hydraulic cylinder coupled to the frame at one end of the cylinder, wherein the frame hydraulic cylinder is configured to connect to the second farming implement at an opposing end of the cylinder, and wherein the frame hydraulic cylinder is configured to vertically pivot the second farming implement relative to the frame when the frame is secured to the second farming implement;

attaching the ends of each of the beams at the first end of the frame to the first farming implement by fixedly securing each of the brackets to the toolbar of the first farming implement;

attaching the second farming implement to the crossbar at the second end of the frame by rotatably securing each of the attachment elements to the second farming implement; and operably connecting the frame hydraulic cylinder to the second farming implement.

10. The method of claim 9, wherein the system further comprises a plurality of hydraulic hoses, wherein the method further comprises the step of operably connecting one respective hydraulic hose to the frame hydraulic cylinder and to each bracket hydraulic cylinder.

11. The method of claim 9, wherein each of the plurality of spaced brackets comprises a C-shaped bracket sized to fixedly secure the bracket to a toolbar having the shape of a square beam, wherein the C-shaped bracket has a generally rectangular interior shape, wherein a top side and an opposing bottom side of the C-shaped bracket have bolt holes configured for fastening the C-shaped bracket to the toolbar with bolts, and wherein the step of attaching the ends of each of the beams at the first end of the frame to the first farming implement comprises fastening each of the C-shaped brackets to the toolbar using bolts.

12. The method of claim 9, wherein each of the plurality of spaced attachment elements comprises a hook with an upwardly facing open end, wherein the step of rotatably securing each of the attachment elements to the second farming implement comprises securing horizontal bars of the second farming implement within each of the hooks.

13. The method of claim 12, wherein each of the plurality of spaced attachment elements further comprises a latch, wherein the method further comprises the step of using the latch to rotatably secure a respective one the horizontal bars within the hook of the attachment element.

14. The method of claim 9, wherein the frame hydraulic cylinder is connected to an attachment point of the frame, wherein the attachment point is attached to a second crossbar at a position that is centered between the beams, wherein the step of operably connecting the frame hydraulic cylinder to the second farming implement comprises connecting the frame hydraulic cylinder to the second farming implement at the position centered between the beams.

15. A farming implement attachment system comprising:
a rigid frame having a first end and a second end, wherein the frame comprises a first set of two generally parallel beams attached to each other by a first crossbar that extends between the first set of beams, wherein the frame further comprises a second set of two generally parallel beams each being generally parallel to the first set of beams and attached to the first crossbar;
a plurality of spaced brackets, wherein each respective one of the brackets is pivotally coupled to an end of a respective one of the beams of the first set of beams at the first end of the frame, wherein each bracket is configured to fixedly secure the bracket to a toolbar of a first farming implement;
a plurality of spaced attachment elements, wherein each attachment element is attached to the second end of the frame and configured to rotatably secure the attachment element to a second farming implement, wherein each of the spaced attachment elements is attached to a second crossbar that extends between the second set of beams and is attached to each of the beams of the second set of beams;
a bracket hydraulic cylinder coupled to each respective bracket at one end of the cylinder and to the frame at an opposing end of the cylinder, wherein the bracket hydraulic cylinders are configured to vertically pivot the frame relative to the first farming implement when each bracket is secured to the toolbar of the first farming implement; and
a frame hydraulic cylinder coupled to the frame at one end of the cylinder, wherein the frame hydraulic cylinder is configured to connect to the second farming implement at an opposing end of the cylinder, and wherein the frame hydraulic cylinder is configured to vertically pivot the second farming implement relative to the frame when the frame is secured to the second farming implement.

16. The farming implement attachment system of claim 15, wherein each of the plurality of spaced brackets comprises a C-shaped bracket sized to fixedly secure the bracket to a toolbar having the shape of a square beam, wherein the C-shaped bracket has a generally rectangular interior shape, wherein a top side and an opposing bottom side of the C-shaped bracket have bolt holes configured for fastening the C-shaped bracket to the toolbar with bolts.

17. The farming implement attachment system of claim 15, wherein each of the plurality of spaced attachment elements comprises a hook with an upwardly facing open end.

18. The farming implement attachment system of claim 17, wherein each of the plurality of spaced attachment elements further comprises a latch configured to rotatably secure a horizontal bar of the second farming implement within the hook of the attachment element.

19. The farming implement attachment system of claim 15, wherein the frame hydraulic cylinder is connected to an attachment point of the frame, wherein the attachment point is attached to the first crossbar at a position that is centered between the beams of the first set of beams.

20. The farming implement attachment system of claim 15, wherein the beams of the first set of beams are a first distance apart and the beams of the second set of beams are a second distance apart, wherein the second distance is different than the first distance.

* * * * *